United States Patent
Lingafelt et al.

(10) Patent No.: US 7,013,394 B1
(45) Date of Patent: *Mar. 14, 2006

(54) DATA FLOW PATTERN RECOGNITION AND MANIPULATION

(75) Inventors: Charles Steven Lingafelt, Durham, NC (US); Francis Edward Noel, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,822

(22) Filed: Apr. 18, 2000

(51) Int. Cl.
*G06F 11/30* (2006.01)

(52) U.S. Cl. .................. 713/200; 713/201

(58) Field of Classification Search ........ 713/200–201, 713/192; 707/10; 711/112; 709/100, 200–203, 709/213, 250, 253, 212, 223, 229; 370/463
See application file for complete search history.

(56) References Cited

U.S. PATENT DOCUMENTS

| | | | | |
|---|---|---|---|---|
| 4,293,928 A | * | 10/1981 | Baun ........................ | 710/64 |
| 5,051,947 A | | 9/1991 | Messenger et al. | |
| 5,325,466 A | | 6/1994 | Kornacker | |
| 5,331,554 A | | 7/1994 | Graham | |
| 5,459,754 A | | 10/1995 | Newby et al. .............. | 375/368 |
| 5,748,850 A | | 5/1998 | Sakurai | |
| 5,838,908 A | * | 11/1998 | Matzke et al. ............. | 709/230 |
| 5,901,246 A | | 5/1999 | Hoffberg et al. ........... | 382/209 |
| 5,960,170 A | * | 9/1999 | Chen et al. ................. | 714/38 |
| 6,065,037 A | * | 5/2000 | Hitz et al. .................. | 709/200 |
| 6,222,380 B1 | * | 4/2001 | Gerowitz et al. ........... | 326/38 |
| 6,230,184 B1 | * | 5/2001 | White et al. ............... | 709/201 |
| 6,272,522 B1 | * | 8/2001 | Lin et al. .................... | 709/200 |
| 6,327,614 B1 | * | 12/2001 | Asano et al. ............... | 709/213 |
| 6,393,489 B1 | * | 5/2002 | Sambamurthy et al. ..... | 709/250 |
| 6,397,345 B1 | * | 5/2002 | Edmonds et al. ............ | 714/4 |
| 6,460,120 B1 | * | 10/2002 | Bass et al. .................. | 711/148 |
| 6,502,131 B1 | * | 12/2002 | Vaid et al. .................. | 709/224 |
| 6,611,870 B1 | * | 8/2003 | Asano et al. ............... | 709/238 |
| 6,697,854 B1 | * | 2/2004 | Glassen et al. ............. | 709/222 |
| 6,826,627 B1 | * | 11/2004 | Sjollema et al. ............ | 709/250 |

OTHER PUBLICATIONS

IBM Technical Disclosure Bulletin, vol. 39, No. 04, Apr. 1996 "Real Time Detection and Disablement of Viruses in a Data Communications Network".

* cited by examiner

*Primary Examiner*—Kim Vu
*Assistant Examiner*—Leynna Ha
(74) *Attorney, Agent, or Firm*—Sawyer Law Group LLP; Scott W. Reid

(57) ABSTRACT

This invention makes use of the capability of a network processor (as described more fully herein) to perform software directed tree searches. Pattern recognition data processing, as expanded upon in the detailed description, opens possibilities for data mining, virus protection, security and other functions. As realized in accordance with the varying embodiments of this invention, significant performance improvements are obtained and highly scaleable systems are created which are capable of examining large amounts of data, both in real time and in batch modes.

25 Claims, 6 Drawing Sheets

DATA FLOW PATTERN RECOGNITION AND MANIPULATION

RELATED APPLICATIONS

The interested reader is referred, for assistance in understanding the inventions here described, to the following prior disclosures which are relevant to the description which follows and each of which is hereby incorporated by reference into this description as fully as if here repeated in full:

U.S. Pat. No. 5,008,878 issued 16 Apr. 1991 for High Speed Modular Switching Apparatus for Circuit and Packet Switched Traffic;

U.S. Pat. No. 5,724,348 issued 3 Mar. 1998 for Efficient Hardware/Software Interface for a Data Switch;

U.S. patent application Ser. No. 09/330,968 filed 11 Jun. 1999 and entitled "High Speed Parallel/Serial Link for Data Communication", now U.S. Pat. No. 6,222,380;

U.S. patent application Ser. No. 09/384,689 filed 27 Aug. 1999 and entitled "VLSI Network Processor and Methods";

U.S. patent application Ser. No. 09/384,691 filed 27 Aug. 1999 and entitled "Network Processor Processing Complex and Methods";

U.S. patent application Ser. No. 09/384,692 filed 27 Aug. 1999 and entitled "Network Switch and Components and Method of Operation"; and U.S. patent application Ser. No. 09/384,744 filed 27 Aug. 1999 and entitled "Network Processor, Memory Organization and Methods", U.S. Pat. No. 6,460,120.

BACKGROUND OF THE INVENTION

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than those that existed just a few years ago.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate simultaneously over a network with a software application running on a single computer system.

One significant computer network that has recently become very popular is the Internet. The Internet grew out of the modern proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on he user's workstation. Information displayed to the user is typically organized into pages that are constructed using a specialized language called Hypertext Markup Language (HTML). Web browsers that use HTML are now available for almost every computer system on the market, making the WWW accessible to practically anyone who has access to a computer and a modem. Although the WWW is becoming increasingly popular, the rapid growth and expansion of computer users accessing the WWW has brought along with it concomitant problems. Some of these problems are identified in this discussion.

Two outgrowths of the world wide web are server farms and DASD (for Direct Access Storage Device, discussed hereinafter) farms. In each instance, the use of the term "farm" is intended to communicate that a number of devices are operatively coupled together in such a way that data may flow more or less seamlessly between and/or among a group of cooperating devices. Thus a plurality of server computer systems cooperate to divide the data handling demands of a network, or a plurality of storage devices cooperate to provide the data storage demands of one or more server computer systems. While the technology to perform these divisions of function is available or under development, problems can arise in such environments which are addressed and overcome by the invention here described.

The description which follows presupposes knowledge of network data communications and switches and routers as used in such communications networks. In particular, the description presupposes familiarity with the OSI model of network architecture which divides network operation into layers. A typical architecture based upon the OSI model extends from Layer 1 (also sometime identified as "L1") being the physical pathway or media through which signals are passed upwards through Layers 2, 3, 4 and so forth to Layer 7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets and frames in such network communication.

SUMMARY OF THE INVENTION

It is a purpose of the present invention to enhance the ability of computer systems and networks as briefly described above to perform pattern recognition data processing. In pursuing this purpose, this invention makes use of the capability of a network processor (as described more fully hereinafter) to perform software directed tree searches. Pattern recognition data processing, as expanded upon in the description which follows, opens possibilities for data mining, virus protection, security and other functions. As realized in accordance with the varying embodiments of this invention, significant performance improvements are obtained and highly scaleable systems are created which are capable of examining large amounts of data, both in real time and in batch modes.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
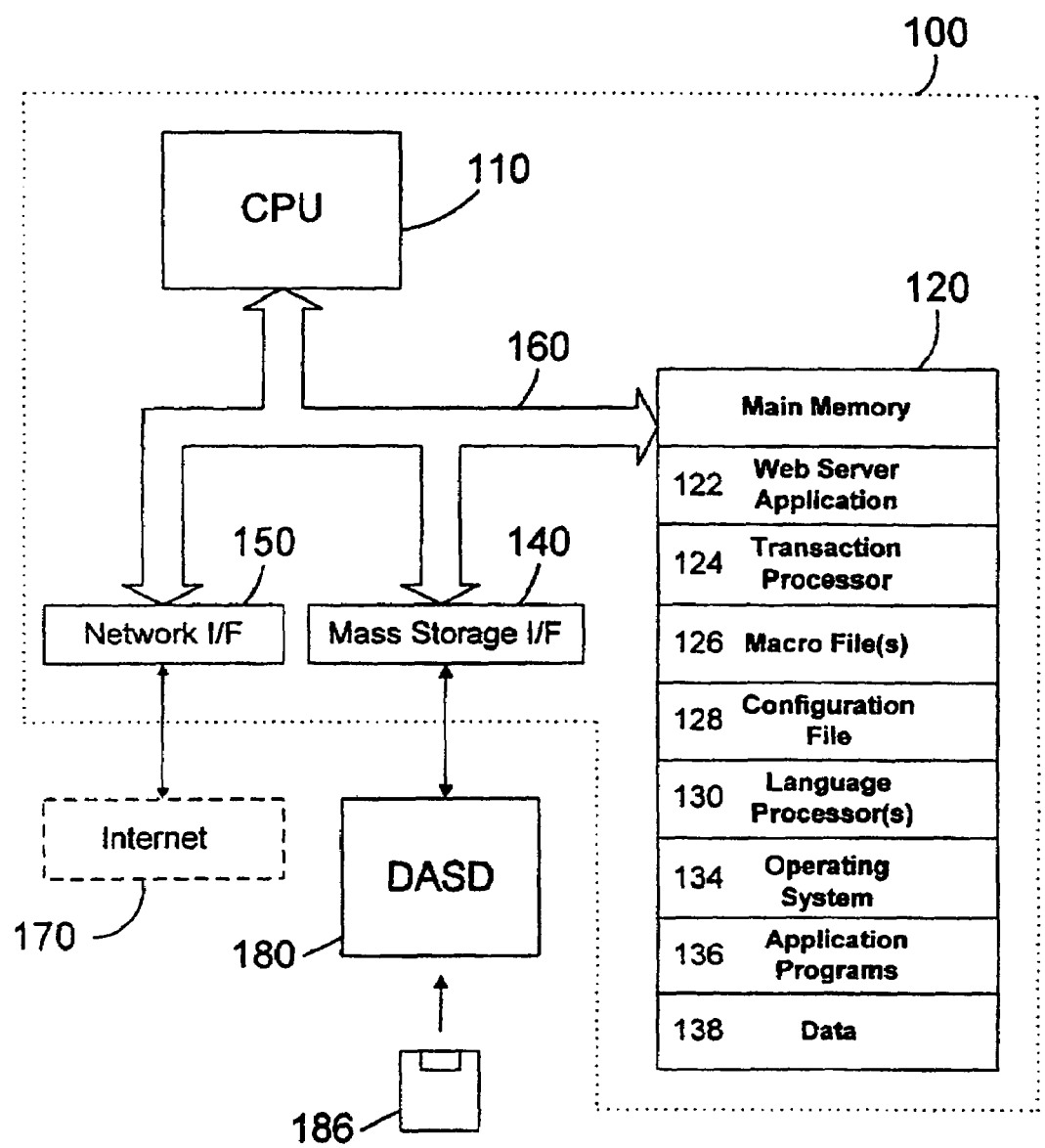
FIG. 1 is a representation of a computer system in which the present invention may be implemented.

Referring to FIG. 1, a computer system 100 as contemplated by the present invention includes a central processing unit (CPU) 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of this are a computer monitor, input keyboard, cache memory, and peripheral devices such as printers. The present invention may operate as a web server, which is generally implemented with a personal or midrange computer, or as a client.

CPU 110 can be constructed from one or more microprocessors and/or integrated circuits. CPU 110 executes program instructions stored in main memory 120. Main memory 120 stores programs and data that the computer may access. When computer system 100 starts up, CPU 110 initially executes the operating system 134 program instructions. Operating system 134 is a sophisticated program that manages the resources of the computer system 100. Some of these resources are the CPU 110, main memory 120, mass storage interface 140, network interface 150, and system bus 160.

In the form illustrated, the main memory 120 includes a web server application 122, a transaction processor 124, one or more macro files 126, a configuration file 128, one or more language processors 130, an operating system 134, one or more application programs 136, and program data 138. Such application programs 136 are executed by CPU 110 under the control of operating system 134. Application programs 136 can be run with program data 138 as input. Application programs 136 can also output their results as program data 138 in main memory. When the computer system 100 operates as a web server, CPU 110 executes, among other things, a web server application 122. Transaction processor 124 is a program that processes an HTML page stored in one or more macro files 126. When transaction processor 124 is initialized, it reads configuration file 128 to correlate different types of queries to different language processors 130. When a query to dynamic data is found in a page, transaction processor 124 determines from the configuration data (read from the configuration file) which language processor 130 it should call to process the query. The appropriate language processor 130 then queries a data source, such as memory or a database, to retrieve the dynamic data. Language processor 130 passes the dynamic data to transaction processor 124, which inserts the dynamic data into the HTML data for the selected page.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is often placed in main memory 120 where CPU 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 180). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100.

Network interface 150 allows computer system 100 to send and receive data to and from any network the computer system with which it may be connected. This network may be a local area network (LAN), a wide network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although the computer system 100 is shown to contain only a single main CPU and a single system bus, those skilled in the art will appreciate that the present invention may be practiced using a computer system that has multiple CPUs and/or multiple buses.

At this point, it is important to note that while the present invention has been (and will continue to be) described in the context of a fully functional computer system, those skilled in the art will appreciate that constituents of the present invention are capable of being distributed as a program product in a variety of forms, and that the present invention applies equally regardless of the particular type of signal bearing media used to actually carry out the distribution. Examples of signal bearing media include: recordable type media such as floppy disks (e.g., 186 of FIG. 1) and CD ROM, and transmission type media such as digital and analog communications links.

In the present invention a computer system 100 may be operated as a web server. To do so, a web server application 122 is executed by CPU 110. Another application program 136 may be run simultaneously on computer system 100 assuming that operating system 134 is a multi-tasking operating system. Web servers are generally connected to the Internet 170. As has been discussed, the Internet is a well known computer network that spans the world and is shared by millions of computers. There are many web servers on the Internet. Each computer linked to the Internet has its own unique address to enable it to communicate across the network with other computers. Many different types of data can be sent along the Internet. Examples are electronic mail, program data, digitized voice data, computer graphics, and web pages. As is well known, certain of these examples may become vehicles for invasive computer virus code and/or be undesirable for other reasons. Thus at least some networks connected to the Internet are separated from that network by protective mechanisms generally known as a firewall.

In accordance with certain embodiments contemplated by this invention, the computer system 100 has coupled thereto through an option bus an option card 200 (FIG. 2) bearing an interface device or network processor hardware subsystem. The association of an option card with a computer system, alluded to above, is well known to persons of skill in the applicable arts. However, for purposes of completeness, the interested reader is referred to the written description and drawings of Heath et al U.S. Pat. No. 5,491,804 issued 13 Feb. 1996 and hereby incorporated by reference into this description to any extent necessary to a full understanding of the present invention. The option bus may be any suitable bus, including by way of example and not limited to a so-called ISA bus, EISA bus, PCI bus, and other similar bus structures used in computer systems of varying capabilities.

The card 200 is formed using a printed circuit board or card 201 on which is formed an edge connector portion 202. The edge connector facilitates mounting the card within a computer system and establishing signal passing communication between the card and the option bus of the computer system. The card 200, in the form illustrated, has an external connector 204 through which the card may be connected to a network external of the computer system (such as a LAN, WAN, or the Internet) and with which data is to be exchanged. Mounted on the card are a network processor 10 and a supporting control point processor 206.

Figure 2:
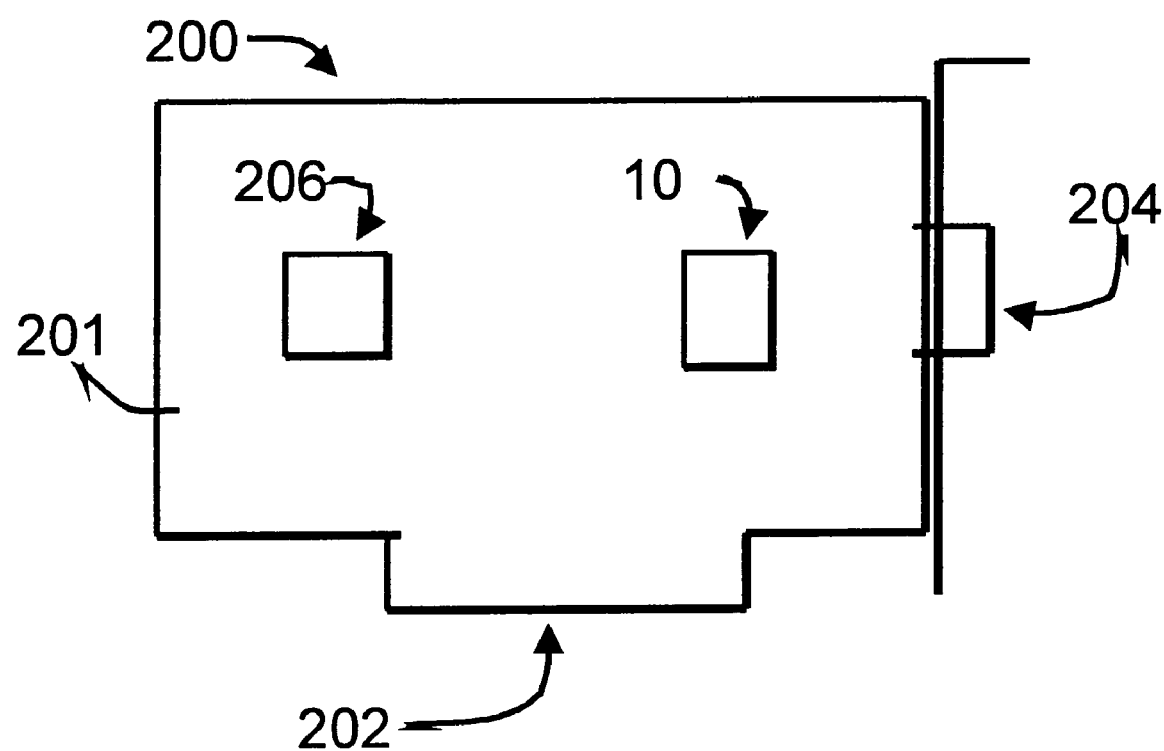
FIG. 2 is a somewhat schematic representation of an option card useful in certain implementations of this invention.
Figure 3:
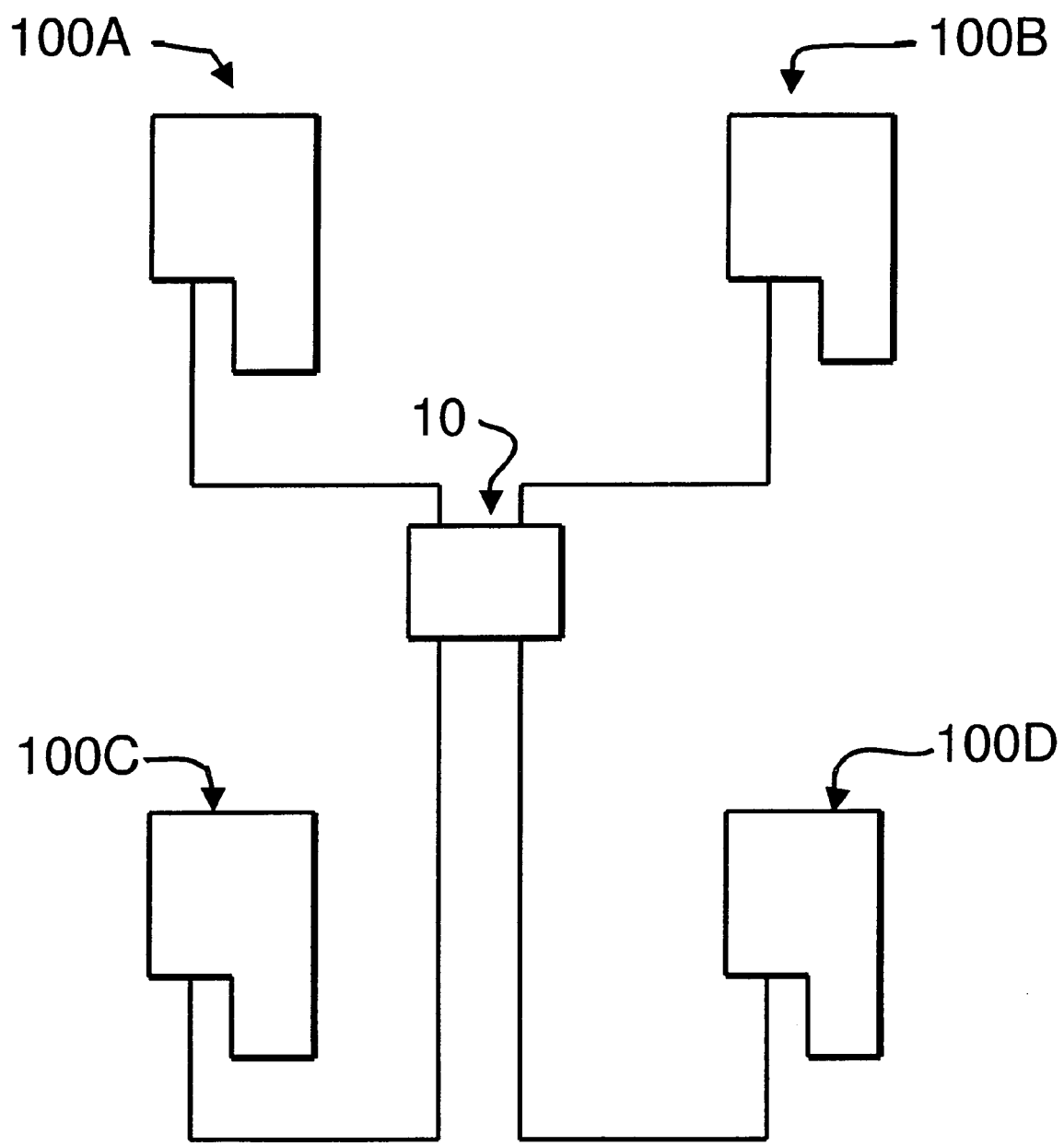
FIG. 3 is a somewhat schematic representation of a server farm as used in certain implementations of this invention.

Referring now to FIG. 3, in other embodiments of the invention contemplated here a plurality of computer systems 100A, 100B, 100C, and 100D are coupled together through a network processor 10 to form a server farm. The network processor 10 as identified here and in FIG. 2 is more fully illustrated and described in FIGS. 5 and 6 and the description of the structure there shown which follows hereinafter. The computer systems joined together in the farm may have differing assigned functions. For example, one may be designated to serve batch processing requests for data mining of data stored on associated DASD. Another in the same farm may be designated as a mail server. Yet another may be designated as handling real time requests for data stored on associated DASD. Yet another may be designated as an application server, making available to other systems on the network application programs which may be transferred for transitory or fugitive use on client systems. Alternatively, the systems may be serving as parallel web page host systems and be dynamically selected based upon incoming requests for service. Persons knowledgeable in the configuration and use of server farm systems will be able to understand the full range of alternative functions here briefly indicated and to develop still further alternatives as the flexibility of this invention becomes recognized.

Data bit streams moving to the server farm of FIG. 3 from any associated network will pass to the network processor 10. The network processor 10, in accordance with important distinguishing features of this invention, may process network communication protocol bits identified in the incoming bit streams and recognize packets or frames or the like which are assignable to one of the farm systems 100A, 100B, 100C and 100D based upon the designated service to be provided by that system. After assignment to the appropriate farm system and processing there, the packets, frames or the like are returned to the network processor for forwarding to the associated network after the network processor supplies the appropriate network communication protocol bits.

Movement of data bit streams to the appropriate one of the farm systems is accomplished, in accordance with this invention, at what is known as media speed. That is, the flow rate of data moving to the one farm system is the same or substantially the same as the flow rate in the network to which the network processor connects the server farm. Further, the movement of data bit streams from the network processor is to the appropriate one of the systems in the farm. Where the systems in the farm are serving a shared purpose, such as being web page hosts operating in parallel, the distribution may, for example, be for load balancing among the farm systems. Where the systems serve distinct designated purposes, the distribution will be for those designated purposes so that data streams related to mail are, for example, directed to a mail server while those for real time retrieval from a stored data base are directed to a server configured for that purpose.

Figure 4:
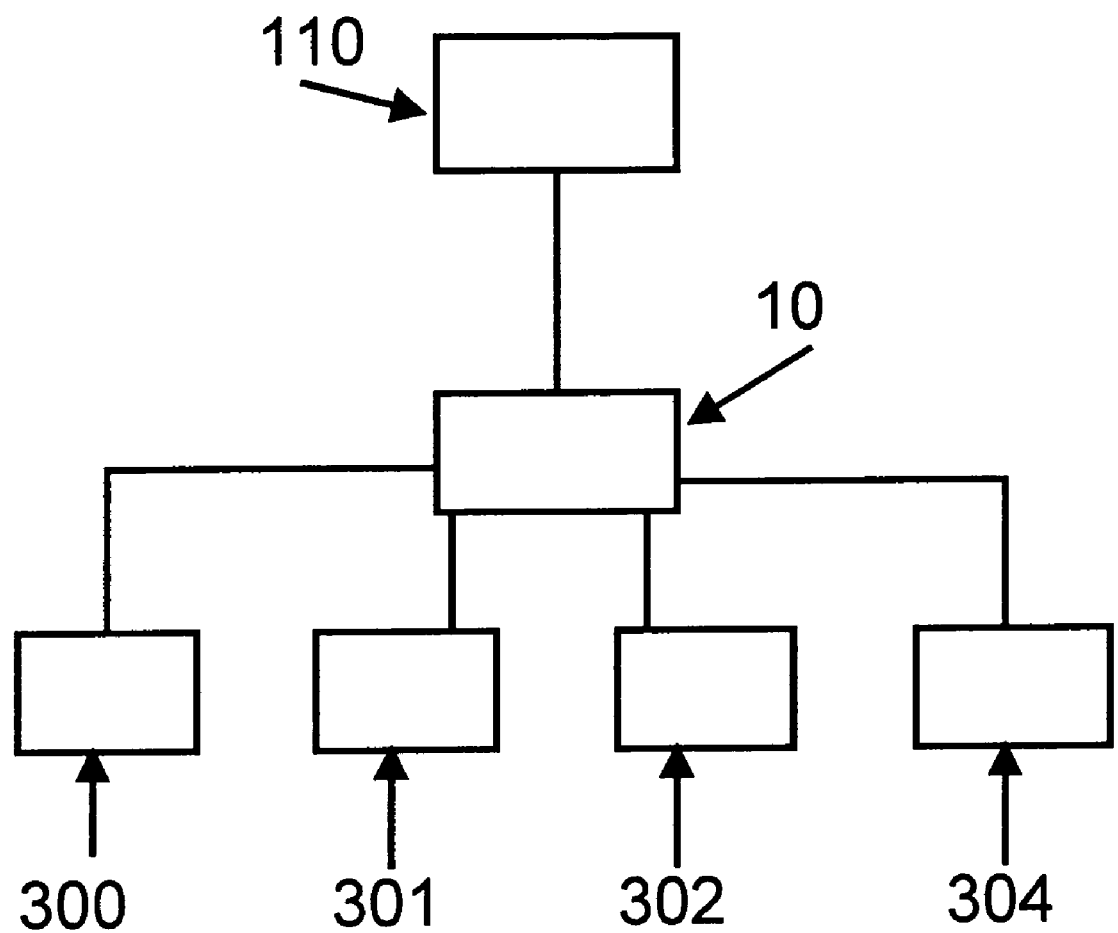
FIG. 4 is a somewhat schematic representation of a DASD farm as used in certain implementations of this invention.

In accordance with yet another implementation of this invention illustrated in FIG. 4, a network processor 10, functioning either with or without an associated secondary switch fabric, is provided within the computer system 100 so as to be interposed between and among the CPU 110 and those elements of the system 100 which together provide direct access storage device (DASD) memory or a DASD farm. The network processor may be integrated into the computer system 100 as indicated at 10 in FIG. 4. There, the NP is interposed between the CPU 110 and each of a plurality of hard drives 300, 301, 302, 304 and among the hard drives which together form a DASD farm as mentioned herein above.

The architecture used for apparatus disclosed hereinafter is based on an interface device or network processor hardware subsystem and a software library running on a control point processor. The interface device or network processor subsystem can be understood as being a high performance frame forwarding engine designed for parsing and translation of L2, L3, and L4+ data strings. The interface device or network processor subsystem can provide a fast-path through an apparatus while the software library and control point processor provide management and route discovery functions needed to maintain the fast-path. The control point processor and the software library running thereon together define the Control Point (CP) of the system. The control point processor may be embedded within the network processor or physically separated therefrom and, in at least certain embodiments, may be a function of an associated CPU.

Industry consultants have defined a network processor as a programmable communications integrated circuit capable of performing one or more of the following functions:

Packet classification—identifying a packet based on known characteristics, such as address or protocol;

Packet modification—modifying the packet to comply with IP, ATM, or other protocols (for example, updating the time-to-live field in the header for IP);

Queue/policy management—reflects the design strategy for packet queuing, de-queuing, and scheduling of packets for specific applications; and Packet forwarding—transmission and receipt of data over the switch fabric and forwarding or routing the packet to the appropriate address.

Although this definition is an accurate description of the basic features of early NPs, the full potential capabilities and benefits of NPs are yet to be realized. Network processors can increase the effective system bandwidth and solve latency problems in a broad range of applications by allowing networking tasks previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks. This definition uses the word "packet", which is consistent with usage commonly referring to wide area networks (WANs). The inventions here described are equally functional with "frames", a term consistent with usage commonly referring to local area networks (LANs). Packets and frames transmitted in series or sequence make up data bit streams.

Network processors are expected to become a fundamental network building block for networks in the same fashion that CPUs are for PCs. Typical capabilities offered by an NP are real-time processing, security, store and forward, switch fabric, and IP packet handling and learning capabilities. The present invention applies these capabilities to data flow pattern recognition and manipulation.

The processor-model NP incorporates multiple general purpose processors and specialized logic. This design provides scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs.

While such a network processor supports multi-layer forwarding in hardware it can also operate as a L2 only switch and that is its default mode of operation in the simplest form disclosed in related applications. Each port will be put into a single domain allowing any device in the domain to communicate with any other device in the domain. The apparatus is configurable at L2 allowing system administrators the ability to configure features such as; grouping ports into separate domains or trunks, configuring Virtual LAN (VLAN) segments, or imposing filters. It is the last named capability which, among others, is utilized by this invention.

Certain portions of the apparatus described hereinafter are designed to be a modular unit using an interface device or network processor (NP) and a Control Point (CP) as its fundamental building blocks. An optional switching fabric device can be used when more than two interface device subsystems are tied together. The optional switching fabric device may be as disclosed in U.S. Pat. No. 5,008,878 issued 16 Apr. 1991 for High Speed Modular Switching Apparatus for Circuit and Packet Switched Traffic mentioned hereinabove and incorporated herein by reference.

This apparatus may consist of a single assembly of an NP, a CP and a media interconnection mechanism. However, a more complex apparatus is anticipated to be assembled using printed circuit board elements also here mentioned as "option cards". The printed circuit board elements have circuit elements mounted thereon and are received in connectors provided in apparatus housings, such as in server computer system housings. The apparatus contemplates that cards can be exchanged among varying chassis or housings, provided that appropriate connectors and backplane electrical connections are provided in each. A basic component found on many if not all such option cards is a carrier subsystem. Starting with the carrier subsystem, three types of cards can be produced. The first type is a CP only card, which consists of a carrier subsystem and a CP subsystem. The primary use of a CP only card is for a product where redundancy is the primary concern. The second type is a CP+Media card, which consists of a carrier subsystem, a CP subsystem, and 1-to-3 media subsystems. The primary use of a CP+Media card is a product where port density is deemed more important than redundancy. The third type is a Media card, which consists of a carrier subsystem and 1-to-4 media subsystems. The media cards can be used in any chassis and the type of media subsystem used is configurable.

Card management will involve fault detection, power management, new device detection, initialization, and configuration. This management will be done using various registers, I/O signals, and a guided cell interface that is used to communicate between the CP and carrier subsystems. Programmable devices and memory exist on all cards. The amount of programmability depends on the type of card. When the CP subsystem exists on a card the CP, carrier subsystems and media subsystems are programmable.

In its simplest form, an interface apparatus contemplated by this invention has a control point processor and an interface device operatively connected to the control point processor. Preferably and as here disclosed, the interface device (also here identified as a network processor or NP) is a unitary Very Large Scale Integrated (VLSI) circuit device or chip which has a semiconductor substrate; a plurality of interface processors formed on the substrate; internal instruction memory formed on said substrate and storing instructions accessibly to the interface processors; internal data memory formed on the substrate and storing data passing through the device accessibly to the interface processors; and a plurality of input/output ports. The interface processors are also sometimes herein identified as picoprocessors or processing units. The ports provided include at least one port connecting the internal data memory with external data memory and at least two other ports exchanging data passing through the interface device with an external device or network under the direction of the interface processors. The control point cooperates with the interface device by loading into the instruction memory instructions to be executed by the interface processors in directing the exchange of data between the data exchange input/output ports and the flow of data through the data memory. Those instructions can include the data flow pattern recognition and manipulation capabilities to which the invention here described is particularly directed.

The network processor here disclosed is deemed inventive apart from the assemblies into which it is incorporated. Further, the network processor here disclosed is deemed to have within its elements here described other and further inventions not here fully discussed. Still further, the various physical architectures here illustrated and described for their usefulness in this invention are deemed applicable to other inventions not here fully disclosed.

Figure 5:
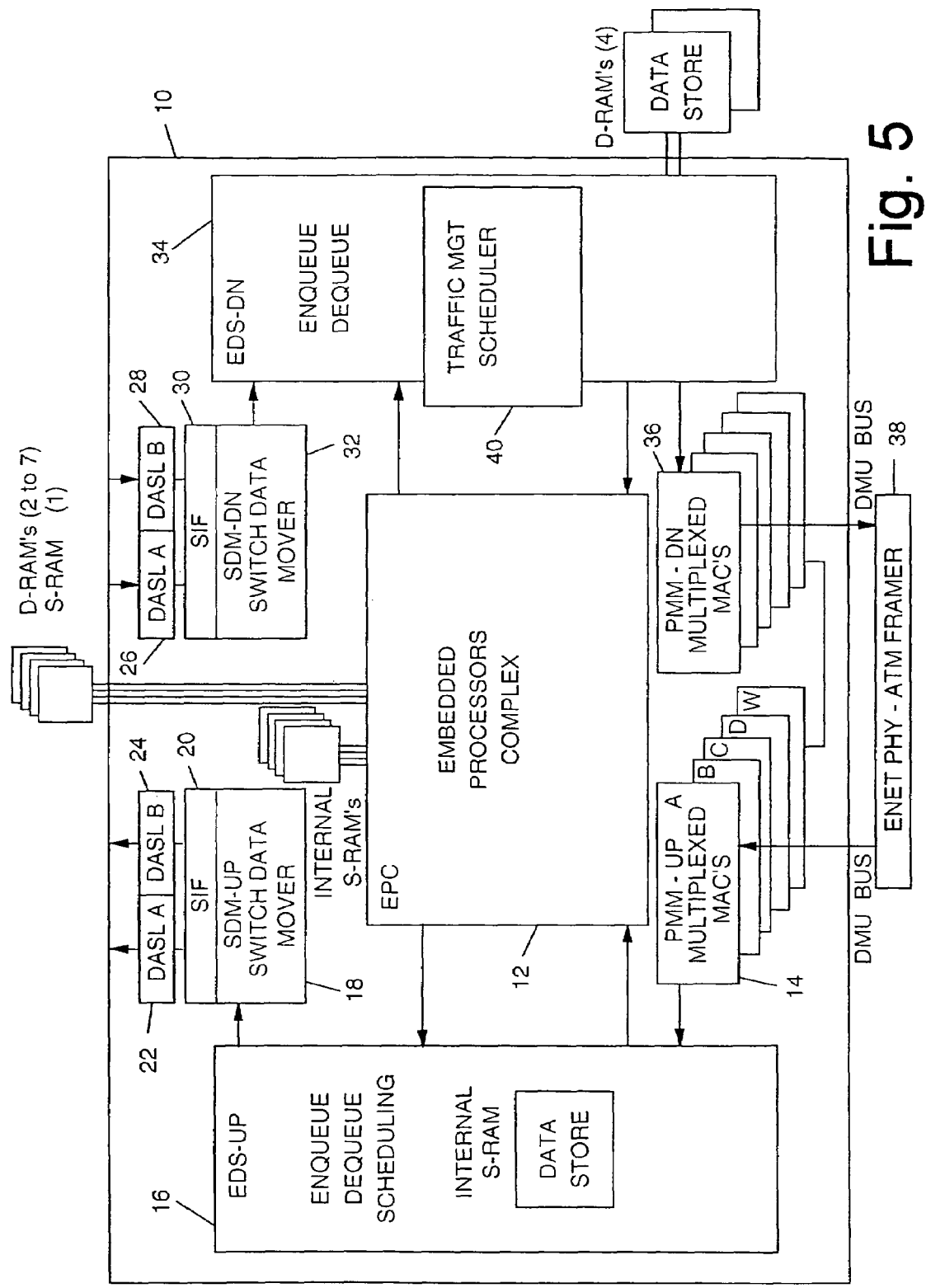
FIG. 5 is a somewhat schematic representation of a network processor as used in this invention.
Figure 6:
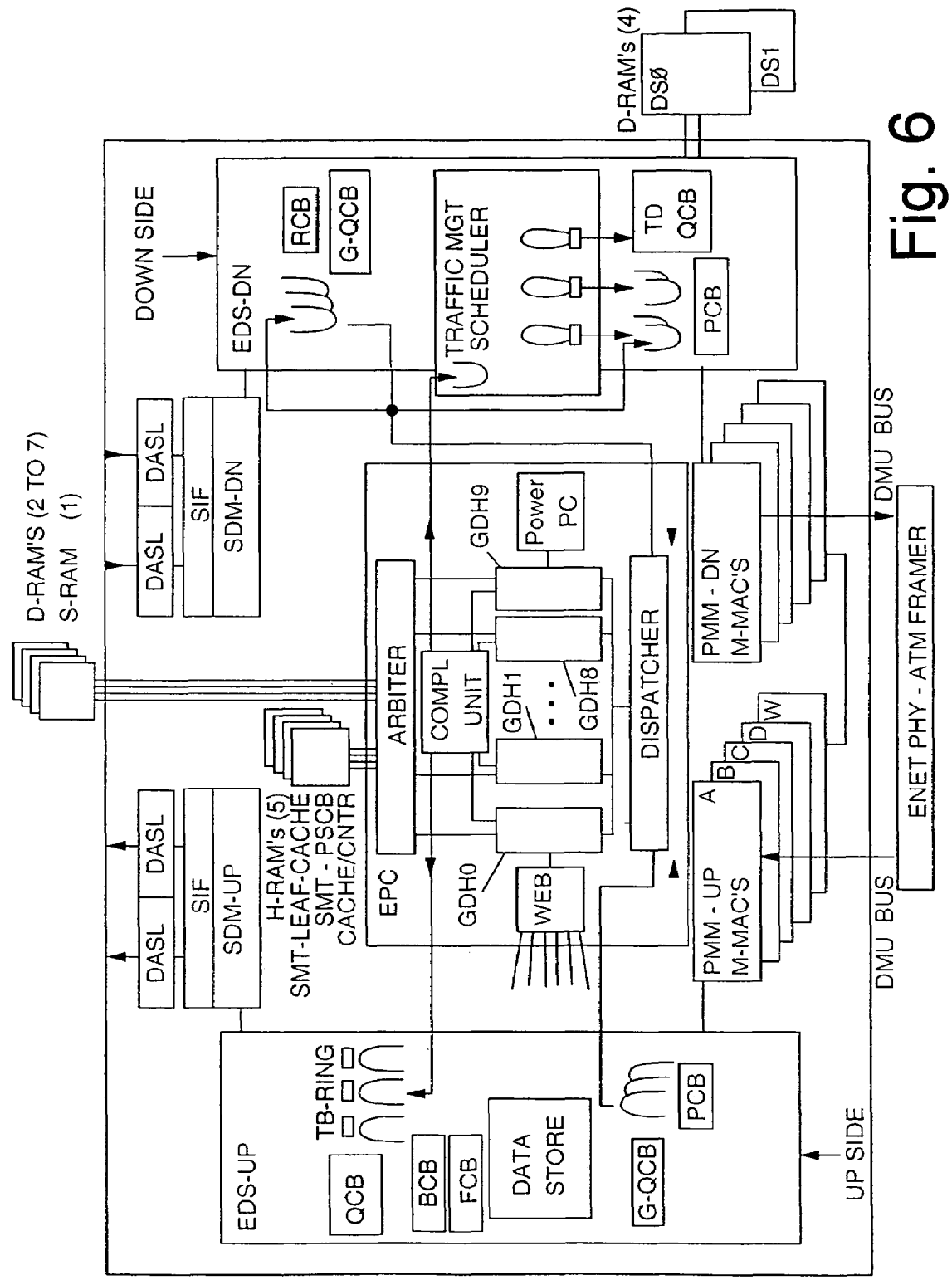
FIG. 6 is another, somewhat schematic, representation of a network processor as used in this invention.

For a more complete understanding, FIG. 5 shows a block diagram for the interface device chip that includes substrate 10 and a plurality of sub-assemblies integrated on the substrate. The sub-assemblies are arranged into an Upside configuration and a Downside configuration. As used herein, "Upside" refers to data flows inbound to the apparatus here disclosed, while "Downside" refers to data outbound from the apparatus to a device or network serviced by the apparatus. The data flow follows the respective configurations. As a consequence, there is an Upside data flow and a Downside data flow. The sub-assemblies in the Upside include Enqueue-Dequeue-Scheduling UP (EDS-UP) logic 16, multiplexed MAC's-UP (PPM-UP) 14, Switch Data Mover-UP (SDM-UP) 18, System Interface (SIF) 20, Data Align Serial Link A (DASLA) 22, and Data Align Serial Link B (DASLB) 24. A data align serial link is more fully described in copending U.S. patent application Ser. No. 09/330,968 filed 11 Jun. 1999 and entitled "High Speed Parallel/Serial Link for Data Communication" incorporated by reference hereinto to any extent necessary for a full understanding of the invention here disclosed. While the preferred form of the apparatus of this invention here disclosed uses a DASL link, the present invention contemplates that other forms of links may be employed to achieve relatively high data flow rates, particularly where the data flows are restricted to being within the VLSI structure.

The sub-assemblies in the downside include DASL-A 26, DASL-B 28, SIF 30, SDM-DN 32, EDS-DN 34, and PPM-DN 36. The chip also includes a plurality of internal S-RAM's, Traffic Mgt Scheduler 40, and Embedded Processor Complex (EPC) 12. An interface device 38 is coupled by respective DMU Busses to PMM 14 and 36. The interface 38 could be any suitable L1 circuitry, such as ethernet Physical (ENET PHY), ATM Framer, IP over SONET, etc. The type of interface is dictated in part by the network media or other device to which the chip is connected. A plurality of external D-RAM's and S-RAM are available for use by the chip.

The arrows show the general flow of data within the interface device. For example, frames received from a MAC are placed in internal Data Store buffers by the EDS-UP. These frames are identified as either normal Data Frames or system control Guided Frames and enqueued to the EPC (FIG. 1). The EPC contains N protocol processors capable of working on up to N frames in parallel (N>1). In an embodiment with ten protocol processors, two of the ten protocol processors are specialized; one for handling Guided Frames (the Generic Central Handler or GCH) and one for building Lookup Data in Control Memory (the Generic Tree Handler or GTH). The EPC also contains a dispatcher which matches new frames with idle processors, a completion unit which maintains frame sequence, a Common Instruction memory shared by all ten processors, a Classifier Hardware Assist which determines frame classification and coprocessor which helps determine the starting instruction address of the frame, Ingress and Egress Data Store interfaces which control read and write operations of frame buffers, a Control Memory Arbiter which allows the ten processors to share Control Memory, a Web Control, Arbiter and interface that allows debug access to internal Interface device data structures, as well as other hardware constructs.

Guided Frames are sent by the dispatcher to the GCH processor as it becomes available. Operations encoded in the Guided Frame are executed, such as register writes, counter reads, MAC configuration changes, and so on. Lookup table alterations, such as adding MAC or IP entries, are passed on to the Lookup Data processor for Control Memory operations, such as memory reads and writes. Some commands, such as MIB counter reads, require a response frame to be built and forwarded to the appropriate port on the appropriate Interface device. In some cases, the Guided Frame is encoded for the Egress side of Interface device. These frames are forwarded to the Egress side of the Interface device being queried, which then executes the encoded operations and builds any appropriate response frame.

Data frames are dispatched to the next available protocol processor for performing frame lookups. Frame data are passed to the protocol processor along with results from the Classifier Hardware Assist (CHA) Engine. The results determine the Tree Search algorithm and starting Common Instruction Address (CIA). Tree Search algorithms supported included Fixed Match Trees (fixed size patterns requiring exact match, such as Layer 2 Ethernet MAC tables), Longest prefix Match Trees (variable length patterns requiring variable length matches, such as subnet IP forwarding) and Software Managed Trees (two patterns defining either a range or a bit mask set, such as used for filter rules). The Software Managed Trees represent the particular opportunities to which the invention here described is directed.

More particularly, data flow pattern recognition is capable of scanning a flow of electronic mail messages for embedded or attached computer virus code, using virus signatures such as are available in known libraries of such signatures. Such scanning can be at media speed; that is, at the speed at which the data flow moves through a network or computer system. Similarly, data which has been stored in DASD, either an individual drive or a DASD farm, can be reviewed for such virus signatures or for other characteristic bit sequences. For example, a data base of geological data may be searched for a bit sequence which might be indicative of a high potential for the presence of petroleum or other substance of interest. As another example, a data base of magnetometer readings gathered by a treasure hunting oceanographic expedition might similarly be searched for a bit sequence indicative of the presence of ferrous metals such as cannonballs on the ocean floor. Such data mining can be done during what might otherwise be down time for a system, such as during back up runs scheduled for periods of minimal use, or in real time under the control of an application. Pattern recognition forms the basis also of security arrangements such a firewalls, which use such technology to identify bit streams to block or to pass, depending upon the patterns detected and the instruction set given to the picoprocessors.

Lookup is performed with the aid of the Tree Search Engine (TSE) Coprocessor, which is a part of each protocol processor. The TSE Coprocessor performs Control memory accesses, freeing the protocol processor to continue execution. Control memory stores all tables, counters, and other data needed by the picocode. Control memory operations are managed by the Control memory Arbiter, which arbitrates memory access among the ten processor complexes.

Frame data are accessed through the Data Store Coprocessor. The Data Store Coprocessor contains a primary data buffer (holding up to eight 16 byte segments of frame data), a scratch pad data buffer (also holding up to eight 16-byte segments of frame data) and some control registers for Data Store operations. Once a match is found, Ingress frame alterations may include a VLAN header insertion or overlay. This alteration is not performed by the interface device processor complex, but rather hardware flags are derived and other Ingress Switch Interface hardware performs the alterations. Other frame alterations can be accomplished by the picocode and the Data Store Coprocessor by modifying the frame contents held in the Ingress Data Store.

Egress Tree Searches support the same algorithms as supported for Ingress Searches. Lookup is performed with the TSE Coprocessor, freeing the protocol processor to continue execution. All Control memory operations are managed by the Control memory Arbiter, which allocates memory access among the ten processor complexes.

Egress frame data are accessed through the Data Store Coprocessor. The Data Store Coprocessor contains a primary data buffer (holding up to eight 16-byte segments of frame data), a scratch pad data buffer (also holding up to eight 16-byte segments of frame data) and some control registers for Data Store operations. The result of a successful lookup contains forwarding information and, in some cases, frame alteration information. Frame alterations can include VLAN header deletion, Time to Live increment (IPX) or decrement (IP), IP Header Checksum recalculation, Ethernet frame CRC overlay or insertion and MAC DA/SA overlay or insertion. IP Header checksums are prepared by the Checksum Coprocessor. Alterations are not performed by the Interface device Processor Complex, but rather hardware flags are created and PMM Egress hardware performs the alterations. Upon completion, the Enqueue Coprocessor is used to help build the necessary formats for enqueuing the frame in the EDS Egress queues and sending them to the Completion Unit. The Completion Unit guarantees frame order from the ten protocol processors to the EDS Egress queues feeding the egress Ethernet MACs.

The completed frames are finally sent by PMM Egress hardware to the MACs and out the ports.

An internal bus, referred to as the Web, allows access to internal registers, counters and memory. The Web also includes an external interface to control instruction step and interrupt control for debugging and diagnostics.

The Tree Search Engine coprocessor provides memory range checking, illegal memory access notification and performs tree search instructions (such as memory read, write or read-add-write) operating in parallel with protocol processor execution.

The Dispatcher controls the passing of frames to the ten protocol processors and manages interrupts and timers.

The Completion Unit guarantees frame order from the processor complex to target port queues. A rich instruction set includes conditional execution, packing (for input hash keys), conditional branching, signed and unsigned operations, counts of leading zeros and more.

The Classifier Hardware Assist engine passes each frame's Layer 2 and Layer 3 protocol header and provides this information with frames as they are dispatched to the protocol processors.

The Control memory Arbiter controls processor access to both internal and external memory.

Egress frames may be stored in either one External Data Buffer (e.g. DS0) or two External Data Buffers (DS0 and DS1). Each Buffer can be comprised of a pair of 2M×16 bit×4 bank DDR DRAM (storing up to 256K 64-byte frames) or a pair of 4M×16 bit×4 bank DDR DRAM (storing up to 512K 64-byte frames). Choose the single External Data Buffer (e.g. DS0) for 2.28 Mpps or add the second Buffer (e.g. DS1) to support 4.57 Mpps Layer 2 and Layer 3 switching. Adding the second Buffer improves performance, but it does not increase frame capacity. The External Data Buffer interface runs at a 133 MHz clock rate with a 266 MHz data strobe and supports configurable CAS latency and drive strength.

Fixed Frame alterations include VLAN tag insertions in the Ingress direction and VLAN tag deletions, Time To Live increment/decrement (IP, IPx), Ethernet CRC overlay/insert and MAC DA/SA overlay/insert in the Egress direction.

Port mirroring allows one receive port and one transmit port to be copied to a system designated observation port without using protocol processor resources. Mirrored Interface device ports are configured to add frame and switch control data. A separate data path allows direct frame enqueuing to the Ingress Switch interface.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
a computer system having
a central processing unit,
memory elements operatively coupled to said central processing unit, and
an option bus operatively coupled to said central processing unit and said memory elements; and
a network processor option card operatively connected to said computer system through said option bus, said option card having mounted thereon:
a plurality of interface processors;
instruction memory storing instructions accessibly to said interface processors;
data memory storing data passing through said option card from said memory elements and accessibly to said interface processors; and
a plurality of input/output ports;
one of said input/output ports exchanging data passing through said option card with an external network under the direction of said interface processors;
said option card cooperating with said computer system in directing the exchange of data between said data exchange input/output ports and the flow of data through said data memory to and from said memory elements in response to execution by said interface processors of instructions loaded into said instruction memory and providing pattern recognition services for the flow of data.

2. Apparatus according to claim 1 wherein said interface processors, said instruction memory, said data memory and said input/output ports are comprised within a network processor.

3. Apparatus according to claim 2 wherein said network processor comprises a semiconductor substrate and further wherein said interface processors, said instruction memory, said data memory and said input/output ports are formed on said semiconductor substrate.

4. Apparatus according to claim 1 wherein the number of said interface processors exceeds four.

5. Apparatus according to claim 1 wherein said option card analyses bit strings for the presence of predetermined indicator bit sequences.

6. Apparatus according to claim 5 wherein said option card analyses bit strings for virus signatures.

7. Apparatus according to claim 5 wherein said option card selects portions of bit strings to be passed to said computer system based upon the determined presence of predetermined indicator bit sequences.

8. Apparatus according to claim 5 wherein said option card selects portions of bit strings to be barred from passage to said computer system based upon the determined presence of predetermined indicator bit sequences.

9. Apparatus according to claim 5 wherein the analysis of bit strings proceeds at the speed of data flow to said option card.

10. Apparatus comprising:
a plurality of a computer systems each having
a central processing unit, and
server memory;
a network processor coupled to each of said computer systems and joining the coupled computer systems into a server farm, said network processor having a plurality of interface processors;
instruction memory storing instructions accessibly to said interface processors;
data memory storing data passing through said network processor to and from each of said coupled computer systems accessibly to said interface processors; and
a plurality of input/output ports;
one of said input/output ports exchanging data passing through said network processor with an external network under the direction of said interface processors;
others of said input/output ports exchanging data passing through said network processor with said coupled computer systems;
said network processor cooperating with said coupled computer systems in directing the exchange of data between said input/output ports and the flow of data through said data memory to and from said coupled computer systems in response to execution by said interface processors of instructions loaded into said instruction memory and providing pattern recognition services for the flow of data.

11. Apparatus according to claim 10 wherein said network processor comprises a semiconductor substrate and further wherein said interface processors, said instruction memory, said data memory and said input/output ports are formed on said semiconductor substrate.

12. Apparatus according to claim 11 wherein the number of said interface processors exceeds four.

13. Apparatus according to claim 10 wherein said network processor analyses bit strings for the presence of predetermined indicator bit sequences.

14. Apparatus according to claim 13 wherein said network processor analyses bit strings for virus signatures.

15. Apparatus according to claim 13 wherein said network processor selects portions of bit strings to be passed to said computer systems based upon the determined presence of predetermined indicator bit sequences.

16. Apparatus according to claim 13 wherein said network processor selects portions of bit strings to be barred from passage to said computer systems based upon the determined presence of predetermined indicator bit sequences.

17. Apparatus according to claim 13 wherein the analysis of bit strings proceeds at the speed of data flow to said network processor.

18. A computer system comprising:
a central processing unit;
a plurality of DASD peripheral devices operatively associated with said central processing unit; and
a network processor operatively interposed between said central processing unit and said DASD peripheral devices and among said DASD peripheral devices,
said network processor having
a plurality of interface processors;
instruction memory storing instructions accessibly to said interface processors;
data memory storing accessibly to said interface processors data passing through said network processor from and to said DASD peripheral devices; and
a plurality of input/output ports exchanging data passing through said network processor with said DASD peripheral devices;
said network processor cooperating with said central processing unit in directing the exchange of data between said input/output ports and the flow of data through said data memory to and from said DASD peripheral devices in response to execution by said interface processors of instructions loaded into said instruction memory and providing pattern recognition services for the flow of data.

19. Apparatus according to claim 18 wherein said network processor comprises a semiconductor substrate and further wherein said interface processors, said instruction memory, said data memory and said input/output ports are formed on said semiconductor substrate.

20. Apparatus according to claim 19 wherein the number of said interface processors exceeds four.

21. Apparatus according to claim 18 wherein said network processor analyses bit strings for the presence of predetermined indicator bit sequences.

22. Apparatus according to claim 21 wherein said network processor analyses bit strings for virus signatures.

23. Apparatus according to claim 21 wherein said network processor selects portions of bit strings to be passed to a receiving one of said computer system and said DASD peripheral devices based upon the determined presence of predetermined indicator bit sequences.

24. Apparatus according to claim 21 wherein said network processor selects portions of bit strings to be barred from passage to a receiving one of said computer system and said DASD peripheral devices based upon the determined presence of predetermined indicator bit sequences.

25. Apparatus according to claim 18 wherein the analysis of bit strings proceeds at the speed of data flow to said network processor.

* * * * *